June 15, 1926.
B. KUGLER
HARNESS FITTING AND ANCHORAGE
1,588,592
Filed Feb. 23, 1926    2 Sheets-Sheet 2
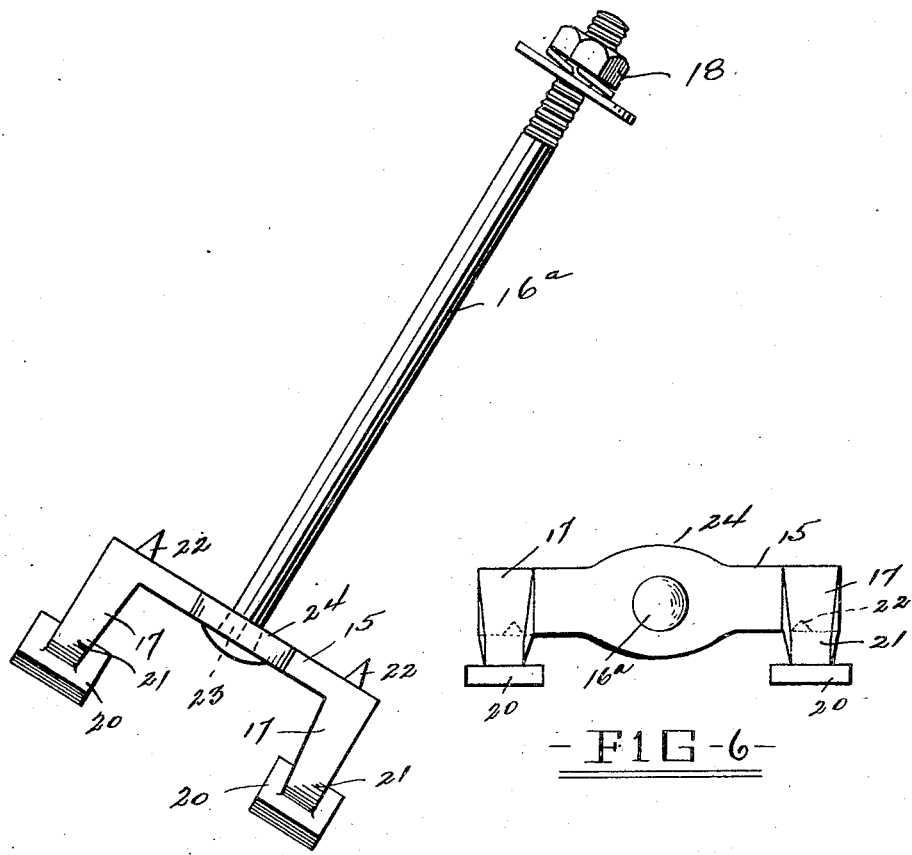
Inventor
BENJAMIN KUGLER,
BY 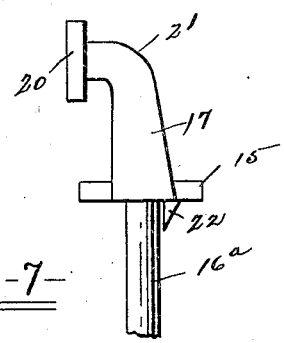
Attorney Patented June 15, 1926.

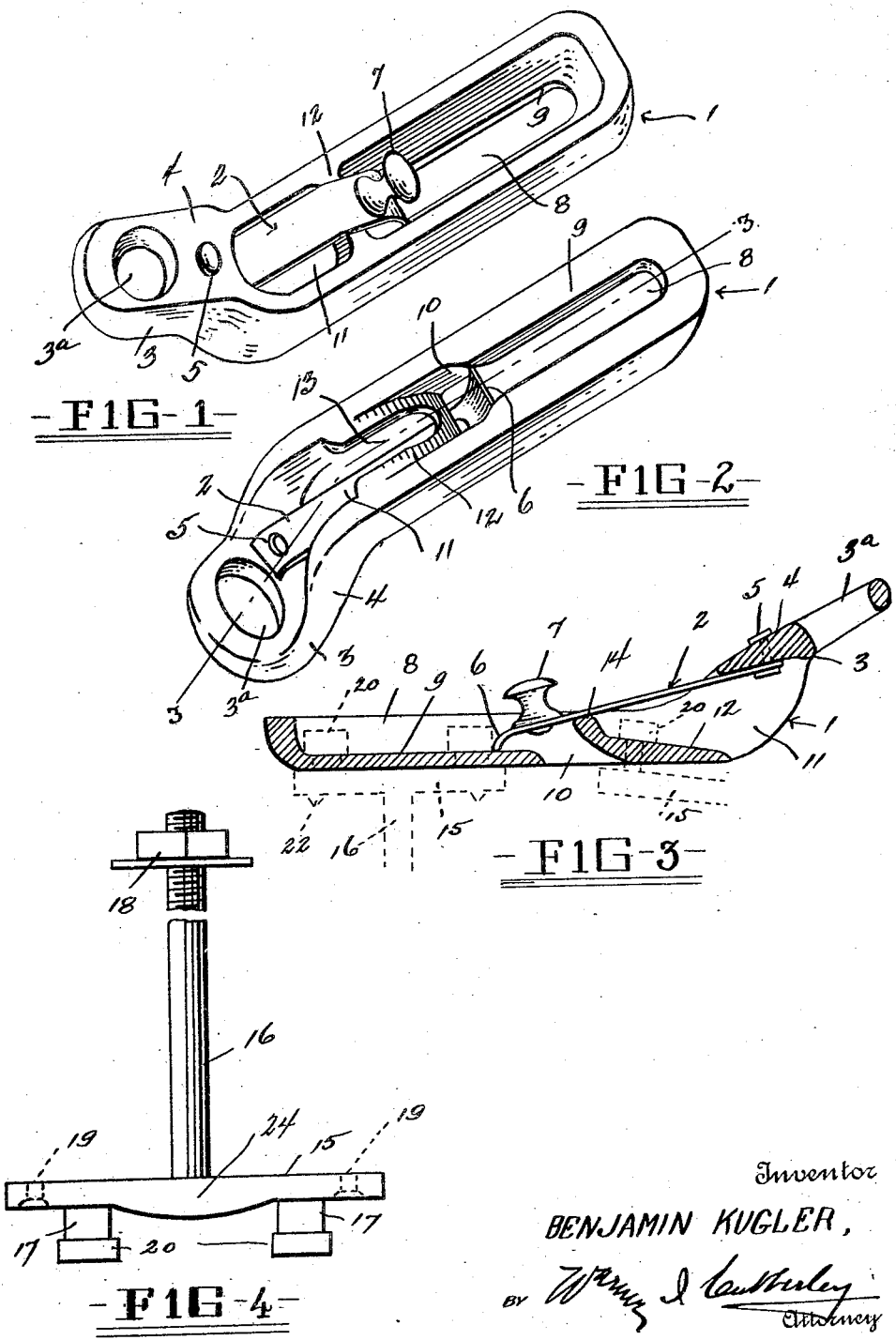

1,588,592

UNITED STATES PATENT OFFICE.

BENJAMIN KUGLER, OF CHICAGO, ILLINOIS.

HARNESS FITTING AND ANCHORAGE.

Application filed February 23, 1926. Serial No. 90,039.

My present invention relates, in its broad aspect, to improvements in terminal couplings and anchoring devices complementary thereto for attaching the harness used by window cleaners and others to a suitable base; and more particularly it is my purpose to provide a locking coupling and improved anchorage therefor of a type similar to those defined in my prior Patents, #1,442,159 granted January 16th, 1923, and #1,449,516 granted March 27th, 1923. My present coupling, however, is simplified in construction and embodies means for temporarily or non-lockingly connecting the same with an anchorage; and my present anchorage is provided with an integral long shank, and with burrs for engaging in a base to prevent turning of my anchorage when it is not desired to utilize screws or like supplementary attaching means. My present anchorage is furthermore provided with laterally extending studs in one of its forms for facilitating attachment of a coupling and eliminating shearing stress on the heads of the studs.

Other and equally important objects of my coupling and anchorage may be briefly defined as follows; first, the body of my coupling is a one-piece metal casting upon which is mounted a single spring locking device, thereby forming my coupling assembly of but two parts; second, my anchorage, including the attaching shank therefor, body, and studs, is a one-piece metal casting thereby reducing the cost of manufacture and preventing the working loose of parts such as are used to form other types of anchorages; third, my anchorage is formed with burrs on either side of its attaching shank to prevent turning under stress; and, fourth, my coupling and anchorage together provide a positive and safe supporting structure for the harness of a window cleaner.

The structural elements employed to accomplish the above, and other results and objects, will be hereinafter more fully described in detail and pointed out in the claims appended hereunto and forming part of this specification.

In the drawing;—

Figure 1 is a perspective view looking toward the top of my coupling,

Figure 2 is a perspective view looking toward the bottom of my coupling,

Figure 3 is a sectional view taken on the line 3—3 of Figure 2,

Figure 4 is a side elevation of one form of my anchorage and shows the shank integral therewith, Figure 5 is a view of another and similar form of my anchorage and shows a detachable shank, or attaching bolt, and burrs for preventing turning of the anchorage under stress.

Figure 6 is a detail view of the head portion of the form of my anchorage shown in Figure 5, and Figure 7 is a side view of the same.

In the drawings wherein like characters of reference are used to designate like or similar parts throughout the several views;—

(1) designates the body of my coupling which is a one-piece casting, and (2) is my spring locking device. These two elements make up my coupling assembly, and due to its simplicity and durability possibility of breakage or the like is largely eliminated, and the cost of manufacture greatly reduced.

The body (1) of my coupling is elongated and provided at one of its ends with an offset or angularly extending portion (3) having therein an opening (3ª) for attaching a supporting strap of a window cleaner's harness (not shown). The web (4) of the portion (3) has attached thereto by a rivet or the like (5) my leaf or plate spring locking device (2) which is formed with a downwardly bent end (6) constituting a "stop" which will be hereinafter described. The spring (2) has a finger knob (7) mounted thereon for raising it when desired. The body is formed with an elongated longitudinal opening (8) and extending into one end and along the two sides of which is a flange (9). The remaining end of the opening (8) is open as at (10). The downwardly bent end (6) of the spring (2) normally engages the flange (9) adjacent the open end (10) as shown in Figures 1, 2 and 3. The body is also provided with another opening (11) between which and the opening (8) is a web (12) which is slotted as at (13). The web (12) extends angularly from the bottom to a point adjacent the top of the body, and the spring (2) is supported adjacent its end (6) upon the top of the web as at (14).

My anchorage (see Figure 4) is formed with an elongated body (15) having integral therewith a long attaching shank (16) and a pair of spaced studs (17). The end of the shank is screwthreaded to receive a nut (18), and the respective ends of the body are provided with countersunk openings (19) to receive screws or the like (not shown) to prevent turning of the anchorage under stress. The studs (17) have enlarged heads (20) which are adapted to be received in either the opening (8) or the slot (13) of my coupling; the heads resting respectively on the flange (9) in one case and upon the web (12) in the other to prevent displacement after the manner shown in dotted lines in Figure 3. When the studs (17) are engaged in the opening (8) they are locked therein by the spring (2) since the bent end (6) thereof forms a "stop" preventing withdrawal from the opening. When the stud or studs, however, are engaged in the slot (13) they may be readily removed since there is no provision made for locking them positively therein; the function in this case is in the nature of a hooking connection between the coupling and studs. In order to remove the anchorage from engagement in the opening (8) it is necessary to raise the spring by manipulation of knob (7).

In Figure 5 is shown a slightly modified form of my anchorage wherein the heads of the studs extend laterally; the studs having a bend (21) therein, and the body of the anchorage is provided with burrs (22) which are adapted to engage in a base to prevent turning of the anchorage under stress. The shank or bolt (16ª) in this case is removable and is formed with a squared end (23) engaging through a similarly shaped opening in the body of the anchorage. The body of each of the anchorages herein described is thickened intermediate its ends as at (24) to reinforce the same adjacent its connection with the shank. It is obvious from the foregoing that the bodies and studs of my anchorage may be adapted for use either with or without integral shanks, or with or without screws, the removable shanks and burrs being used in lieu thereof.

In operation, my anchorages are mounted as permanent equipment of a building, the shanks being designed for bolting through window frames. Window cleaners in harness simply attach the couplings to the anchorages, and when this is done falling is prevented. While in the foregoing, there has been illustrated and described such combination and arrangement of elements as constitute the preferred forms of my anchorage, it is nevertheless desired to emphasize the fact that interpretation of my invention should only be conclusive when made in the light of the subjoined claims.

I claim:—

1. A device of the type described comprising a body formed with a pair of openings separated from each other by a web, said web provided with a slot, and a spring carried by the body and projecting into one of the openings.

2. A device of the type described comprising a body formed with a pair of openings separated from each other by a web, and either of which is adapted to receive attaching means for the device, said web provided with a slot, and a stop device carried by the body and projecting into one of the openings for the purpose defined.

3. A device of the type described comprising an elongated body formed with spaced openings and either of which is designed to receive attaching means for the device, and a stop carried by the body and projecting into one of the openings for the purpose defined.

4. A device of the type described comprising a body formed with an extension, and a pair of openings separated from each other by a web, a flange surrounding a portion of one opening, a slot formed in the web, and a spring carried by the body and engaging the flange in the opening and supported at a point on its length by the web.

5. A device of the type described comprising an elongated one-piece body formed with an extension extending angularly from one end thereof, and a pair of openings in said body separated from each other by an inclined web portion, a flange surrounding a portion of one opening, said web provided with a slot, and a spring carried by the body and engaging the flange in the opening and supported at a point in its length by the web.

6. In combination with an anchorage including a body formed with an attaching shank and studs, said studs having laterally extending heads, a coupling formed with openings, either of which is designed to receive said studs, and a spring device carried by the coupling and extending into one of the openings for engagement with the studs to prevent withdrawal of the studs from the opening.

In testimony whereof, I affix my signature hereunto.

BENJAMIN KUGLER.